United States Patent
Wang et al.

(10) Patent No.: US 9,704,060 B2
(45) Date of Patent: Jul. 11, 2017

(54) METHOD FOR DETECTING TRAFFIC VIOLATION

(71) Applicants: CLOUD COMPUTING CENTER CHINESE ACADEMY OF SCIENCES, DongGuan, Guangdong (CN); INSTITUTE OF AUTOMATION CHINESE ACADEMY OF SCIENCES, Beijing (CN)

(72) Inventors: Feiyue Wang, Guangdong (CN); Bin Tian, Guangdong (CN); Ye Li, Guangdong (CN); Bo Li, Guangdong (CN); Kunfeng Wang, Guangdong (CN); Gang Xiong, Guangdong (CN); Fenghua Zhu, Guangdong (CN); Bin Hu, Guangdong (CN)

(73) Assignees: CLOUD COMPUTING CENTER CHINESE ACADEMY OF SCIENCES, DongGuan, Guangdong (CN); INSTITUTE OF AUTOMATION CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 14/775,628

(22) PCT Filed: Dec. 25, 2013

(86) PCT No.: PCT/CN2013/090417
§ 371 (c)(1),
(2) Date: Sep. 11, 2015

(87) PCT Pub. No.: WO2015/089867
PCT Pub. Date: Jun. 25, 2015

(65) Prior Publication Data
US 2016/0034778 A1    Feb. 4, 2016

(30) Foreign Application Priority Data
Dec. 17, 2013  (CN) .................... 2013 1 07001759

(51) Int. Cl.
*G06K 9/46*  (2006.01)
*G08G 1/017*  (2006.01)
(Continued)

(52) U.S. Cl.
CPC ....... *G06K 9/4671* (2013.01); *G06K 9/00785* (2013.01); *G06T 7/246* (2017.01);
(Continued)

(58) Field of Classification Search
CPC ............ G06K 9/4671; G06K 9/00785; G06K 2209/15; G06T 7/208; G06T 7/2033;
(Continued)

(56) References Cited

FOREIGN PATENT DOCUMENTS

CN          102867416 B  *  1/2013

OTHER PUBLICATIONS

St-Pierre, Mathieu, and Denis Gingras. "Comparison between the unscented Kalman filter and the extended Kalman filter for the position estimation module of an integrated navigation information system." Intelligent Vehicles Symposium, 2004 IEEE. IEEE, 2004.*

* cited by examiner

*Primary Examiner* — Amandeep Saini (57) ABSTRACT

The present invention relates to a technical field of traffic monitoring, and more particularly to a method for detecting traffic violation. The present invention includes firstly localizing vehicle salient parts through salient features including vehicle license numbers and vehicle rear lights, and representing a vehicle with the vehicle salient parts, then tracking the vehicle with a Kalman filter based on the vehicle salient parts, and finally detecting vehicle violation through moving (Continued)

trajectory analysis and setting violating detecting areas. The present invention solves vehicle violation detection problems in complex engineering application conditions such as illumination change and detection noise, and is suitable for city traffic management under complex conditions.

8 Claims, 4 Drawing Sheets (51) Int. Cl.
*G06K 9/00* (2006.01)
*G06T 7/246* (2017.01)
*G06T 7/277* (2017.01)

(52) U.S. Cl.
CPC ........... *G06T 7/277* (2017.01); *G08G 1/0175* (2013.01); *G06K 2209/15* (2013.01); *G06T 2207/10016* (2013.01); *G06T 2207/10024* (2013.01); *G06T 2207/20024* (2013.01); *G06T 2207/20164* (2013.01); *G06T 2207/30232* (2013.01); *G06T 2207/30236* (2013.01); *G06T 2207/30241* (2013.01); *G06T 2207/30252* (2013.01); *G06T 2207/30256* (2013.01)

(58) Field of Classification Search
CPC . G06T 2207/30232; G06T 2207/30241; G06T 2207/10016; G06T 2207/20024; G06T 2207/20164; G06T 2207/30252; G06T 2207/30256; G06T 2207/30236; G06T 2207/10024; G08G 1/0175
USPC ........................................................ 382/105
See application file for complete search history.

METHOD FOR DETECTING TRAFFIC VIOLATION

CROSS REFERENCE OF RELATED APPLICATION

This is a U.S. National Stage under 35 U.S.C 371 of the International Application PCT/CN2013/090417, filed Dec. 25, 2013, which claims priority under 35 U.S.C. 119(a-d) to CN 201310700175.9, filed Dec. 17, 2013.

BACKGROUND OF THE PRESENT INVENTION

Field of Invention

The present invention relates to a technical field of traffic monitoring, and more particularly to a method for detecting traffic violation.

Description of Related Arts

In large and medium cities, with the development of urbanization, traffic congestion, traffic violation and traffic accidents are also increasing. In order to more effectively control and manage traffic, intelligent traffic has caused wide attention. Traffic information service is an important part of intelligent traffic system functions, which firstly needs to monitor the traffic flow, so as to rapidly and accurately obtain different traffic parameters. With the sudden increase of video sensors, the traditional manual passive monitoring has been far from meeting the needs of monitoring tasks. Therefore, an object of video sensor research is to realize an intelligent automatic monitoring function which is able to take the place of human eyes; particularly a traffic violation detection system based on monitoring videos, which is able to monitor vehicle violation actions and recognize vehicle license plate.

Video-based traffic violation detection system is able to reduce the traffic accidents by regulating the driving behavior of the drivers, in such a manner that the traffic problems caused by traffic regulations are alleviated. Conventionally, video-based traffic violation detection technology comprises: vehicle localizing, vehicle tracking and license plate recognition. In conventional intelligent traffic system, vehicle localizing technology is widely used in traffic monitoring, which mainly comprises moving object localizing and static object localizing. According to a method for localizing moving objects, vehicles on roads are regarded as the moving objects, wherein illumination changes are handled, which is suitable for backgrounds with multi modes and slow changes. However, a moving object is not necessarily a vehicle. Therefore, many researchers use the visual information of the vehicle surface to localizing, which is based on features such as colors, edges and corners to learn a vehicle or a vehicle part model, and then uses a classifier and a generative model to localizing the vehicle. A method for tracking vehicles is based on technologies such as mean shift, Kalman filter and particle filter. In the simplest case, Euclidean distance, size and angle constraints are used to match the object between adjacent frames. Further, the Kalman filter and the particle filter can be used to estimate the object location of the next frame, so as to better complete the tracking process. Object tracking based on mean shift belongs to an object appearance tracking method, which is effective even in traffic congestion. In summary, the conventional traffic video monitoring system still faces the following challenges during engineering application:

1. All-weather monitoring: wherein in different time period of a day, light conditions change largely, especially between day and night; at night, strobe fill lights are commonly employed, so as to see vehicle information within a fill range; but the fill range is usually dozens of meters, which makes it difficult to complete the vehicle tracking, not to mention judgment of vehicle violation.

2. Occluded vehicle: wherein in images, a vehicle may be occluded by other vehicles, or by non-vehicle objects (such as pedestrians, bicycles, trees, and buildings); for example, monitoring camera is arranged at the traffic intersection, vehicles waiting for the signal lamp are easy to block each other; or, a small vehicle is easy to be blocked by a large one, resulting in a short-time detection loss.

3. Pose change: wherein during pose changes of the vehicle, such as turning and driveway changing, road, surface characteristics of in the image is greatly changed.

4. Great intra-class differences and diverse backgrounds: wherein vehicles have different shapes, sizes, and colors; in a complex scene, background objects such as non-motorized vehicles, pedestrians and road traffic facilities are mixed with the vehicle object.

5. Different resolution: wherein during the vehicle passing through the camera view, a pixel number thereof changes largely.

After searching the prior art, it is found that in the Chinese patent 201310251206.7, a method for modeling based on background modeling are disclosed, which extracts a moving vehicle target, and judges violation according a position in a moving foreground. However, during vehicle detection, a moving object is not necessarily a vehicle, and method for modeling based on backgrounds is difficult to handle the occluded vehicle problem. In the Chinese patent 200810240499.8, a vehicle violation detection system is disclosed, which is able to detect running red light, speeding, etc. However, the system needs a pressure sensing device and a speed measuring device besides a camera, for supporting a capture process, resulting in high cost. In summary, the conventional traffic violation detection systems usually use moving information for detection, which has a low monitoring accuracy, and is not able to meet the growing demand for traffic monitoring. Many systems need to be combined with auxiliary equipments such as video cameras and coils, which raises costs. At the same time, during installation and maintenance thereof, traffic must be disrupted and road must be destroyed. Therefore, it is quite difficult to maintain, and maintenance cost is high.

SUMMARY OF THE PRESENT INVENTION

An object of the present invention is to overcome defects in the conventional technology, and provide a method for detecting traffic violation based on salient vehicle part models. In complex engineering application conditions such as illumination change and detection noise, the method is able to real-time and accurately localize and track a vehicle object, and complete vehicle violation detection through trajectory analysis, so as to provide a reliable and effective method for city traffic management.

Accordingly, the present invention provides: a method for detecting traffic violation, comprising steps of:

S1: calibrating a road traffic scene;

S2: localizing all vehicle license plates in a video sequence;

S3: localizing all vehicle rear lights in the video sequence;

S4: tracking vehicles based on a plurality of vehicle salient parts, for obtaining moving trajectories of the vehicles:

wherein according to a vehicle localizing result in a previous frame, a vehicle position in a current frame is predicted; a vehicle position result in the current frame is handled as a measured value, for searching an observed value of each of the vehicles tracked through calculating an Euclidean distance between a predicted position and a measured position; a predicted value and the observed value are calculated by weighting for updating the predicted value as a current position of an object; and S5: analyzing the moving trajectories of the vehicles, and setting detecting areas of different violations, so as to complete vehicle violation detection.

In the step S4, based on the vehicle salient parts, the vehicles are tracked with an extended Kalman filter method, for obtaining the moving trajectories of the vehicles; wherein in the extended Kalman filter method, a center position of the vehicle license plate and speed information are handled as system state variables;

wherein in the step S4, it is defined that if the vehicle part is continuously tracked for no less than 3 frames, then the vehicle part is in a stable state;

wherein searching the observed value of the vehicle has rules of:

RULE 1: if a stable vehicle license plate is detected near the predicted position while a vehicle light state is not stable, then the vehicle license plate is used for representing the vehicle and as the observed value thereof; meanwhile, a stable state of the vehicle light and a relative position between the vehicle light and the vehicle license plate are updated;

RULE 2: if the vehicle license plate is not detected near the predicted position or a non-stable vehicle license plate is detected, then the vehicle light is further searched; if the vehicle light is stable, then the vehicle light is used for representing the vehicle and as the observed value thereof;

RULE 3: if the stable vehicle license plate is detected while the vehicle searched is also stable, then distances thereof between the predicted positions are respectively calculated, and a shorter one is used as the observed value; meanwhile, the relative position between the vehicle light and the vehicle license plate is updated;

RULE 4: if the non-stable vehicle license plate is detected near the predicted position and the vehicle light is not stable, then a position of the vehicle license plate is used as the observed value; and RULE 5: if the vehicle license plate is not detected near the predicted position and the vehicle light is not stable, then the object is regarded as being missed; if the object is continuously missed for 3 frames, then the object is regarded as being out of the road traffic scene.

In the step S5, certain detecting areas are set for different violation types; meanwhile, a plurality of evidence images and violation information are stored;

wherein a method for setting the detecting areas of different violations and analyzing the trajectories comprises steps of:

(1) for red light running: setting two detecting areas respectively in front of and behind a stop line, recording and analyzing the moving trajectories of each vehicle, wherein if a signal light of a current driveway is a red light, and the moving trajectories passes the two detecting areas in sequence, then the vehicle is regarded as running the red light; extracting three overall images of the vehicle in front of, at and behind the stop line, and a close-up image of the vehicle; calling a vehicle license plate recognizing program for recognizing the vehicle license plate; finally combining the images and marking the violation information comprising a violation time, an intersection location, the driveway and a vehicle license number, for post-treatment by a traffic management department;

(2) for line-pressing driving: marking driveway line areas where line pressing during driving is forbidden; recording and analyzing the moving trajectory of each vehicle, wherein if the moving trajectory passes through the driveway line area, then the vehicle is regarded as being line-pressing driving; extracting an overall image of the vehicle in a line pressing state and a close-up image of the vehicle; calling the vehicle license plate recognizing program for recognizing the vehicle license plate; finally combining the images and marking the violation information, for post-treatment by the traffic management department; and (3) for improper driveway driving: setting two detecting areas respectively at two driveways, wherein if the moving trajectory passes through the two detecting areas in sequence, then the vehicle is regarded as being improper driveway driving; extracting three overall images of the vehicle before, during and after driveway changing, and a close-up image of the vehicle; calling the vehicle license plate recognizing program for recognizing the vehicle license plate; finally combining the images and marking the violation information, for post-treatment by the traffic management department;

wherein traffic violation detection based on the salient parts is completed.

In the step S1, calibrating the road traffic scene comprises selecting a high definition video clip shot by a monitoring camera, wherein a definition thereof is 2592×1936, a video scene covers an intersection of three-driveway-roads; for obtaining physical coordinate parameters related to the images, using a built-in camera calibrating function of OpenCV for calibrating the road traffic scene; marking image areas according to marked lines of roads with known sizes in the image, so as to inter-transform between an image coordinate system and a physical coordinate system, for obtaining physical coordinates of all positions in the image; furthermore, reading the video with a function of the OpenCV and importing into a computer;

in the step S2, localizing all the vehicle license plates in the video sequence comprises using gray-scale images of black vehicle license plates with white words and white vehicle license plates with black words as color gray-scale images; for blue and yellow vehicle license plates, firstly using a following formula for transforming an image space into a certain color space;

$$C_{x,y} = \|B_{x,y} - \min\{R_{x,y}, G_{x,y}\}\|$$

then using a Sobel operator for calculating an image gradient in a vehicle license plate colorful image; and using a sliding window for scanning a gradient image, so as to obtain an average gradient within the sliding window; wherein a size of the sliding window equals to a size of the vehicle license plate; by using a calibrating result of the OpenCV, the size of the vehicle license plate is obtained;

finally, determining an area size of the vehicle in a scoring image, using a non-maximum suppression method for obtaining a local maximum value within a vehicle area, wherein if the local maximum value is higher than a predetermined scoring threshold, then the local maximum value is set as a center point; a vehicle license plate area is obtained based on international vehicle license plate size information, and the vehicle license plate area is handled as a candidate vehicle license plate area;

in the step S3, localizing all the vehicle rear lights in the video sequence comprises obtaining the color gray-scale image of each frame in the video sequence according to a color, which is red, of the vehicle rear light; wherein a color gray-scale value of a pixel x in the image is calculated with a following formula:

$$C_{x,y}=R_{x,y}-\max\{G_{x,y}, B_{x,y}\}-\|Gx, y-B_{x,y}\|*2$$

then using a multi-threshold method for dividing the color gray-scale image into a plurality of binary images;

then respectively processing the binary images with connected part analysis, using connected parts, whose length-width ratios and area values are within a certain range, as vehicle rear light areas;

finally, for overlapping candidate vehicle rear light areas, keeping a largest area for obtaining a detected vehicle rear light area;

wherein in the above formulas, $R_{x,y}$, $G_{x,y}$ and $B_{x,y}$ are respectively pixel values of the pixel x in red, green and blue channels, $C_{x,y}$ is a gray-scale value of the pixel x after transformation.

Beneficial effects of the present invention are as follows:

Compared with the conventional technology, the present invention is able to automatically detect vehicle part positions in the video sequences, obtain the moving trajectory of the vehicle by tracking the vehicle parts, and finally detect vehicle violation by analyzing the vehicle trajectory; which needs no pre-treatment for an original video signal, and has a high robustness to interference such as occluded vehicle, shadows in bright lighting conditions, light illumination changes, camera jitter and detection noise in actual video. Due to overcome the difficulties in the practical engineering application of the conventional techniques, the present invention realizes traffic violation detection in traffic monitoring video.

According to traffic violation detection requirements in intelligent video monitoring, the present invention applies image processing, feature extraction, and object tracking, for real-time detection of vehicles violation, which has advantages such as simple algorithm, high accuracy, and strong robustness. Especially, the present invention needs no pre-treatment for an original video signal, so as to realize automatically vehicle violation detection. The present invention not only overcomes the difficulties in the conventional techniques, but also eliminates a major obstacle in realizing the real engineering application. By image processing, feature extraction, and object tracking, the present invention provides real-time and accurately localizing and tracking of the object vehicle, completes vehicle violation detection through moving trajectory analysis, and provides a reliable and effective method for city traffic management.

BRIEF DESCRIPTION OF THE DRAWINGS

Referring to drawings, the present invention is further illustrated.

DETAILED DESCRIPTION OF THE PREFERRED EMBODIMENT

In order to make a technical scheme of the present invention to solve technical problems clearer, referring to a preferred embodiment and drawings, the present invention is further illustrated.

Figure 1:
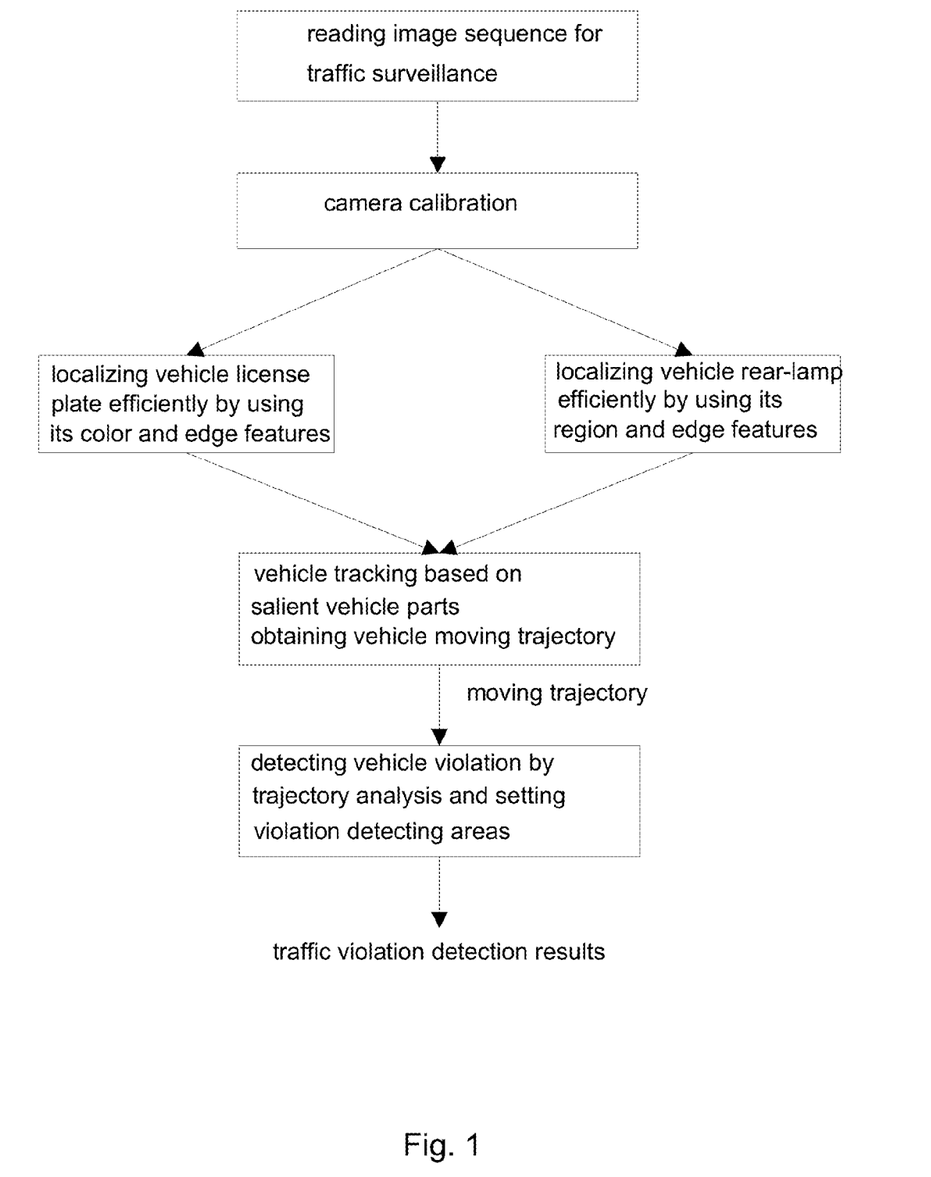
FIG. 1 is a flow chart of a method for detecting traffic violation based on salient vehicle part models according to the present invention.

FIG. 1 is a flow chart of a method for detecting traffic violation based on salient vehicle part models according to the present invention, wherein a method for detecting traffic violation based on salient vehicle part models comprises steps as follows:

S1: calibrating a road traffic scene.

According to the preferred embodiment, the step S1 specifically comprises selecting a high definition video clip shot by a monitoring camera, wherein a definition thereof is 2592×1936, a video scene covers an intersection of three-driveway-roads; for obtaining physical coordinate parameters related to the images, using a built-in camera calibrating function of OpenCV (which is an Intel open source computer visual library) for calibrating the road traffic scene; marking image areas according to marked lines of roads with known sizes in the image, so as to inter-transform between an image coordinate system and a physical coordinate system, for obtaining physical coordinates of all positions in the image; furthermore, reading the video with a function of the OpenCV and importing into a computer.

S2: localizing all vehicle license plates in a video sequence.

The step S2 is not a key point of the present invention, and is able to be achieved with conventional technologies. A calculation process thereof is briefly described as follows. According to Chinese national standard, a background color of the vehicle license plate comprises blue, yellow, white and black. In the preferred embodiment, blue vehicle license plate with white words and yellow vehicle license plate with black words are illustrated as examples, wherein similarly, gray-scale images of black vehicle license plate with white words and white vehicle license plate with black words are directly used as color gray-scale images thereof. According statistically results, for the blue vehicle license plate, a blue channel value $B_{x,y}$ of a background color pixel thereof is much higher than other two channel values, and values of $R_{x,y}$ and $G_{x,y}$ are both small with no much difference. Yellow and blue are complementary in color. For the yellow vehicle license plate, the blue channel value $B_{x,y}$ of the background color pixel thereof is much lower than other two channel values, and values of $R_{x,y}$ and $G_{x,y}$ are both large with no much difference. Therefore, the step S2 specifically comprises firstly using a following formula for transforming an image space into a certain color space;

$$C_{x,y}=\|B_{x,y}-\min\{R_{x,y}, G_{x,y}\}\| \qquad (1)$$

then using a Sobel operator for calculating an image gradient in a vehicle license plate colorful image; and using a sliding window for scanning a gradient image, so as to obtain an average gradient within the sliding window; wherein a size of the sliding window equals to a size of the vehicle license plate; by using a calibrating result of the OpenCV, the size of the vehicle license plate is obtained;

finally, determining an area size of the vehicle in a scoring image, using a non-maximum suppression method for obtaining a local maximum value within a vehicle area, wherein if the local maximum value is higher than a predetermined scoring threshold, then the local maximum value is set as a center point; a vehicle license plate area is obtained based on international vehicle license plate size information, and the vehicle license plate area is handled as a candidate vehicle license plate area.

S3: localizing all vehicle rear lights in the video sequence.

The step S3 is not a key point of the present invention, and is able to be achieved with conventional technologies. A calculation process thereof is briefly described as follows. The step S3 specifically comprises obtaining the color gray-scale image of each frame in the video sequence according to a color, which is red, of the vehicle rear light; wherein a color gray-scale value of a pixel x in the image is calculated with a following formula:

$$C_{x,y}=R_{x,y}-\max\{G_{x,y}, B_{x,y}\}-\|Gx, y-B_{x,y}\|*2 \quad (2)$$

wherein $R_{x,y}$, $G_{x,y}$ and $B_{x,y}$ are respectively pixel values of the pixel x in red, green and blue channels, $C_{x,y}$ is a gray-scale value of the pixel x after transformation;

then using a multi-threshold method for dividing the color gray-scale image into a plurality of binary images; according to the present invention, three thresholds are used for dividing the color gray-scale image, wherein the three thresholds are respectively 20, 60 and 80;

then respectively processing the binary images with connected part analysis, using connected parts, whose length-width ratios and area values are within a certain range, as vehicle rear light areas;

finally, for overlapping candidate vehicle rear light areas, keeping a largest area for obtaining a detected vehicle rear light area.

S4: tracking vehicles based on a plurality of vehicle salient parts, for obtaining moving trajectories of the vehicles:

wherein in the preferred embodiment, the vehicles are tracked with an extended Kalman filter method, for obtaining the moving trajectories of the vehicles; wherein in the extended Kalman filter method, a center position of the vehicle license plate and speed information are handled as system state variables.

Figure 2:
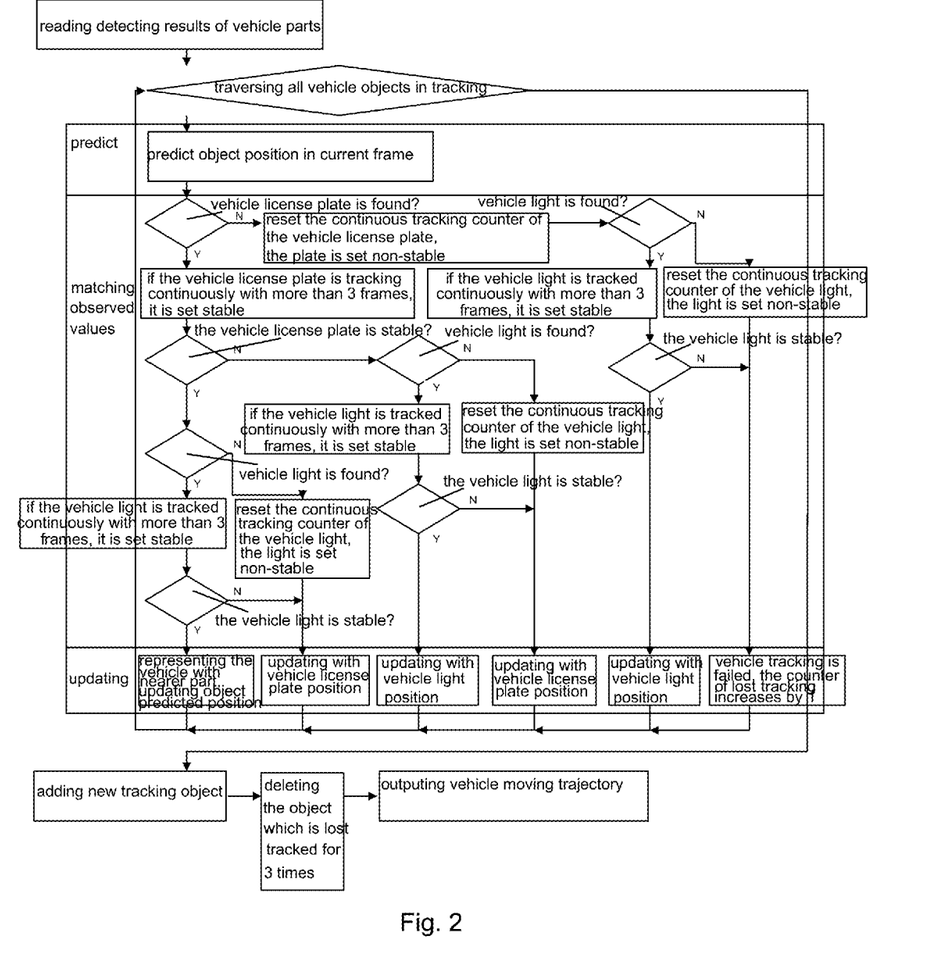
FIG. 2 is a flow chart of a tracking algorithm based on the salient vehicle part models according to the present invention.

FIG. 2 is a flow chart of a tracking algorithm based on the salient vehicle part models according to the present invention, wherein the step S4 further comprises steps of:

S41: according to a vehicle localizing result in a previous frame, predicting a vehicle position in a current frame; and S42: handling a vehicle position result in the current frame as a measured value, for searching an observed value of each of the vehicles tracked through calculating an Euclidean distance between a predicted position and a measured position; wherein a predicted value and the observed value are calculated by weighting for updating the predicted value as a current position of an object;

wherein a stable state of the vehicle parts is defined as: if the vehicle part is continuously tracked for no less than 3 frames, then the vehicle part is in the stable state;

wherein in the step S42, searching the observed value of the vehicle has rules of:

RULE 1: if a stable vehicle license plate is detected near the predicted position while a vehicle light state is not stable, then the vehicle license plate is used for representing the vehicle and as the observed value thereof; meanwhile, a stable state of the vehicle light and a relative position between the vehicle light and the vehicle license plate are updated;

RULE 2: if the vehicle license plate is not detected near the predicted position or a non-stable vehicle license plate is detected, then the vehicle light is further searched; if the vehicle light is stable, then the vehicle light is used for representing the vehicle and as the observed value thereof;

RULE 3: if the stable vehicle license plate is detected while the vehicle searched is also stable, then distances thereof between the predicted positions are respectively calculated, and a shorter one is used as the observed value; meanwhile, the relative position between the vehicle light and the vehicle license plate is updated;

RULE 4: if the non-stable vehicle license plate is detected near the predicted position and the vehicle light is not stable, then a position of the vehicle license plate is used as the observed value; and RULE 5: if the vehicle license plate is not detected near the predicted position and the vehicle light is not stable, then the object is regarded as being missed; if the object is continuously missed for 3 frames, then the object is regarded as being out of the road traffic scene; and S43: calculating a predicted value and the observed value obtained in the step S42 by weighting for updating the predicted value as a current position of an object.

S5: analyzing the moving trajectories of the vehicles, and setting detecting areas of different violations, so as to complete vehicle violation detection.

Figure 3:
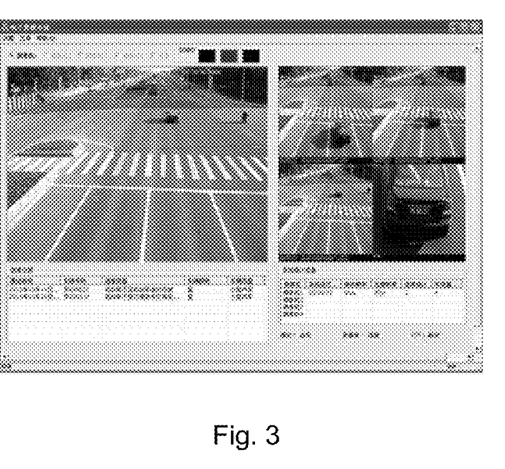
FIG. 3 illustrates an interface of a configuration program on an industrial personal computer according to the present invention.
Figure 4:
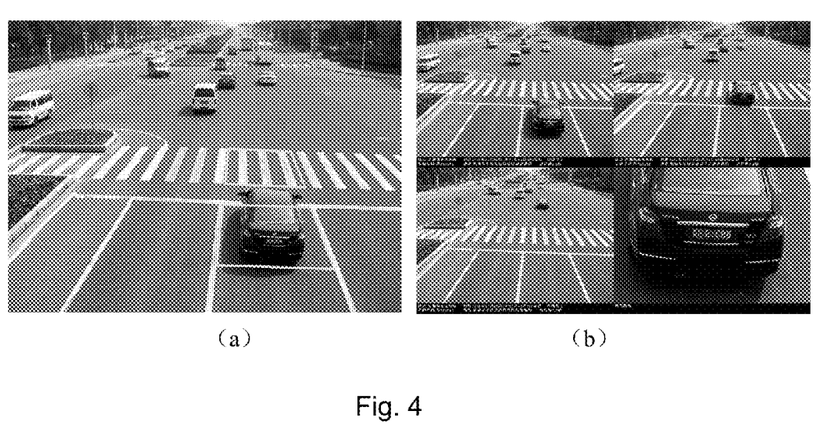
FIG. 4 illustrates a result of red light running detection according to a preferred embodiment of the present invention.
Figure 5:
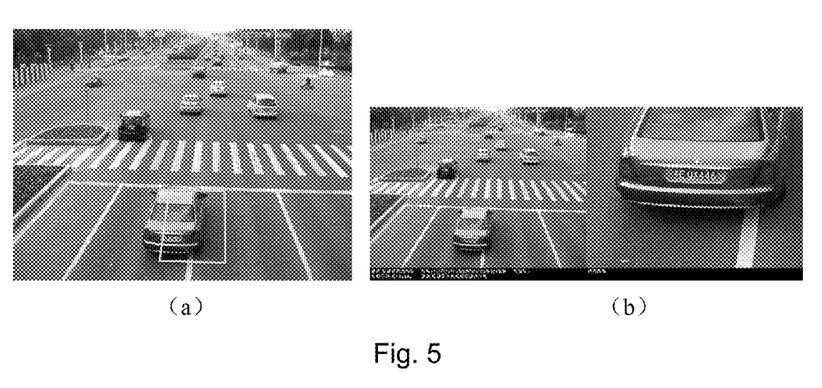
FIG. 5 illustrates a result of line-pressing driving detection according to the preferred embodiment of the present invention.
Figure 6:
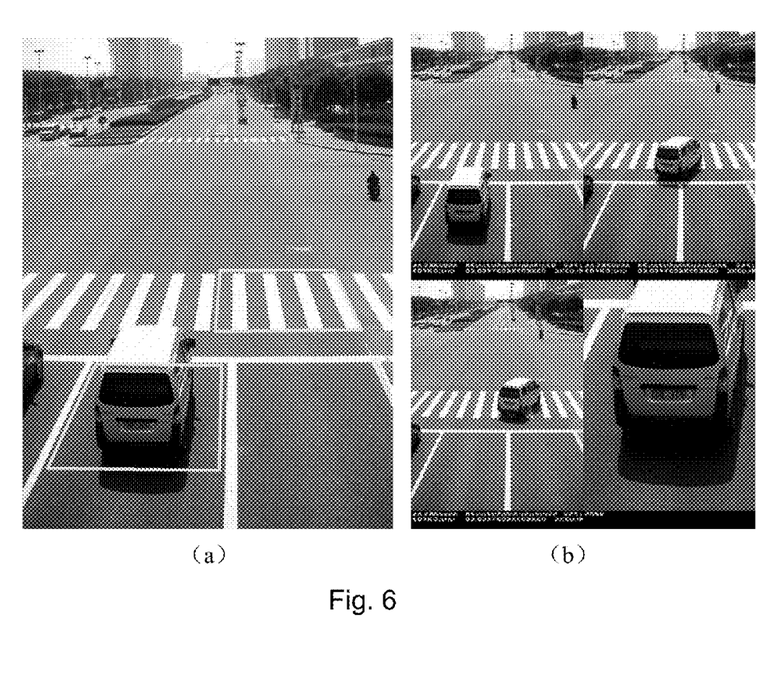
FIG. 6 illustrates a result of improper driveway driving detection according to the preferred embodiment of the present invention.

According to the preferred embodiment, a hardware platform of a traffic violation detection system comprises a 500 megapixel high-definition camera, an industrial personal computer and two fill lights, wherein a resolution of the high-definition camera is 2592*1936, and a frame speed thereof is 8.3 frames per second; a processor the industrial personal computer is Core™ i5-3210M CPU 2.50 GHZ and a memory thereof is 4G; the fill light is opened at night or lacking light, a fill range is up to three driveways; wherein data transmission between the industrial personal computer and the camera adopts a network cable method. The method for detecting traffic violation is further illustrated as follows:

According to the preferred embodiment of the present invention, three types of traffic violation are detected, comprising red light running, line-pressing driving and improper driveway driving. FIG. 3 illustrates a configuration program on the industrial personal computer. A method for setting the detecting areas of different violations and analyzing the trajectories comprises steps of:

(1) for red light running: setting two detecting areas respectively in front of and behind a stop line, which is illustrated as rectangles in FIG. 4(a), recording and analyzing the moving trajectories of each vehicle, wherein if a signal light of a current driveway is a red light, and the moving trajectories passes the two detecting areas in sequence, then the vehicle is regarded as running the red light; extracting three overall images of the vehicle in front of, at and behind the stop line, and a close-up image of the vehicle; calling a vehicle license plate recognizing program for recognizing the vehicle license plate; finally combining the images and marking the violation information comprising a violation time, an intersection location, the driveway and a vehicle license number, for post-treatment by a traffic management department, as illustrated in FIG. 4(b); wherein vehicle license plate recognizing is not a key point of the present, and will not be further described;

(2) for line-pressing driving: marking driveway line areas where line pressing during driving is forbidden, which is illustrated as rectangles in FIG. 5(a); recording and analyzing the moving trajectory of each vehicle, wherein if the moving trajectory passes through the driveway line area, then the vehicle is regarded as being line-pressing driving; extracting an overall image of the vehicle in a line pressing state and a close-up image of the vehicle; calling the vehicle license plate recognizing program for recognizing the vehicle license plate; finally combining the images and marking the violation information, for post-treatment by the traffic management department, as illustrated in FIG. 5(b); and (3) for improper driveway driving: detecting illegal turning and illegal straight driving, which is essentially detecting whether the vehicle runs from one driveway into another driveway; for example, if the vehicle turns left and into a straight driveway, then it is detected as illegal straight; wherein the step (3) specially comprises setting two detecting areas respectively at two driveways, which is illustrated as rectangles in FIG. 6(a), wherein if the moving trajectory passes through the two detecting areas in sequence, then the vehicle is regarded as being improper driveway driving; extracting three overall images of the vehicle before, during and after driveway changing, and a close-up image of the vehicle; calling the vehicle license plate recognizing program for recognizing the vehicle license plate; finally combining the images and marking the violation information, for post-treatment by the traffic management department, as illustrated in FIG. 6(b);

wherein the traffic violation detection based on the salient parts is completed.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for detecting traffic violation, comprising steps of:
   S1: calibrating a road traffic scene by a monitoring camera;
   S2: localizing all vehicle license plates in a video sequence with an industrial personal computer;
   S3: localizing all vehicle rear lights in the video sequence with the industrial personal computer;
   S4: tracking vehicles based on a plurality of vehicle salient parts by the monitoring camera, for obtaining moving trajectories of the vehicles:
   wherein according to a vehicle localizing result in a previous frame, a vehicle position in a current frame is predicted; a vehicle position result in the current frame is handled as a measured value, for searching an observed value of each of the vehicles tracked through calculating an Euclidean distance between a predicted position and a measured position; a predicted value and the observed value are calculated by weighting for updating the predicted value as a current position of an object; and
   S5: analyzing the moving trajectories of the vehicles with the industrial personal computer, and setting detecting areas of different violations, so as to complete vehicle violation detection.

2. The method, as recited in claim 1, wherein in the step S4, based on the vehicle salient parts, the vehicles are tracked with an extended Kalman filter method, for obtaining the moving trajectories of the vehicles; wherein in the extended Kalman filter method, a center position of the vehicle license plate and speed information are handled as system state variables;
   wherein in the step S4, it is defined that if the vehicle salient part is continuously tracked for no less than 3 frames, then the vehicle salient part is in a stable state;
   wherein searching the observed value of the vehicle has rules of:
   RULE 1: if a stable vehicle license plate is detected near the predicted position while a vehicle light state is non-stable, then the vehicle license plate is used for representing the vehicle and as the observed value thereof; meanwhile, a stable state of the vehicle light and a relative position between the vehicle light and the vehicle license plate are updated;
   RULE 2: if the vehicle license plate is not detected near the predicted position or a non-stable vehicle license plate is detected, then the vehicle light is further searched; if the vehicle light is stable, then the vehicle light is used for representing the vehicle and as the observed value thereof;
   RULE 3: if the stable vehicle license plate is detected while the vehicle searched is also stable, then distances thereof between the predicted positions are respectively calculated, and a shorter one is used as the observed value; meanwhile, the relative position between the vehicle light and the vehicle license plate is updated;
   RULE 4: if the non-stable vehicle license plate is detected near the predicted position and the vehicle light is non-stable, then a position of the vehicle license plate is used as the observed value; and
   RULE 5: if the vehicle license plate is not detected near the predicted position and the vehicle light is non-stable, then the object is regarded as being missed; if the object is continuously missed for 3 frames, then the object is regarded as being out of the road traffic scene.

3. The method, as recited in claim 2, wherein in the step S5, certain detecting areas are set for different violation types; meanwhile, a plurality of evidence images and violation information are stored;
   wherein a method for setting the detecting areas of different violations and analyzing the moving trajectories comprises steps of:
   (1) for red light running: setting two detecting areas respectively in front of and behind a stop line, recording and analyzing the moving trajectories of each vehicle, wherein if a signal light of a current driveway is a red light, and the moving trajectories passes the two detecting areas in sequence, then the vehicle is regarded as running the red light; extracting three overall images of the vehicle in front of, at and behind the stop line, and a close-up image of the vehicle; calling a vehicle license plate recognizing program for recognizing the vehicle license plate; finally combining the images and marking the violation information comprising a violation time, an intersection location, the driveway and a vehicle license number, for post-treatment by a traffic management department;
   (2) for line-pressing driving: marking driveway line areas where line pressing during driving is forbidden; recording and analyzing the moving trajectory of each vehicle, wherein if the moving trajectory passes through the driveway line area, then the vehicle is regarded as being line-pressing driving; extracting an overall image of the vehicle in a line pressing state and a close-up image of the vehicle; calling the vehicle license plate recognizing program for recognizing the vehicle license plate; finally combining the images and marking the violation information, for post-treatment by the traffic management department; and (3) for improper driveway driving: setting two detecting areas respectively at two driveways, wherein if the moving trajectory passes through the two detecting areas in sequence, then the vehicle is regarded as being improper driveway driving; extracting three overall images of the vehicle before, during and after driveway changing, and a close-up image of the vehicle; calling the vehicle license plate recognizing program for recognizing the vehicle license plate; finally combining the images and marking the violation information, for post-treatment by the traffic management department;

thereby, traffic violation detection based on the salient parts is completed.

4. The method, as recited in claim 2, wherein:

in the step S1, calibrating the road traffic scene comprises selecting a high definition video clip shot by the monitoring camera, wherein a definition thereof is 2592×1936, a video scene covers an intersection of three-driveway-roads; for obtaining physical coordinate parameters related to the images, using a built-in camera calibrating function of OpenCV (an Intel open source computer visual library) for calibrating the road traffic scene; marking image areas according to marked lines of roads with known sizes in the image, so as to inter-transform between an image coordinate system and a physical coordinate system, for obtaining physical coordinates of all positions in the image; furthermore, reading the video with a function of the OpenCV and importing into a computer;

in the step S2, localizing all the vehicle license plates in the video sequence comprises using gray-scale images of black vehicle license plates with white words and white vehicle license plates with black words as color gray-scale images; for blue and yellow vehicle license plates, firstly using a following formula for transforming an image space into a certain color space;

$$C_{x,y} = \|B_{x,y} - \min\{R_{x,y}, G_{x,y}\}\|$$

then using a Sobel operator for calculating an image gradient in a vehicle license plate colorful image; and using a sliding window for scanning a gradient image, so as to obtain an average gradient within the sliding window; wherein a size of the sliding window equals to a size of the vehicle license plate; by using a calibrating result of the OpenCV, the size of the vehicle license plate is obtained;

finally, determining an area size of the vehicle in a scoring image, using a non-maximum suppression method for obtaining a local maximum value within a vehicle area, wherein if the local maximum value is higher than a pre-determined scoring threshold, then the local maximum value is set as a center point; a vehicle license plate area is obtained based on international vehicle license plate size information, and the vehicle license plate area is handled as a candidate vehicle license plate area;

in the step S3, localizing all the vehicle rear lights in the video sequence comprises obtaining the color gray-scale image of each frame in the video sequence according to a color, which is red, of the vehicle rear light; wherein a color gray-scale value of a pixel x in the image is calculated with a following formula:

$$C_{x,y} = R_{x,y} - \max\{G_{x,y}, B_{x,y}\} - \|Gx, y - B_{x,y}\| * 2$$

then using a multi-threshold method for dividing the color gray-scale image into a plurality of binary images;

then respectively processing the binary images with connected part analysis, using connected parts, whose length-width ratios and area values are within a certain range, as vehicle rear light areas;

finally, for overlapping candidate vehicle rear light areas, keeping a largest area for obtaining a detected vehicle rear light area;

wherein in the above formulas, $R_{x,y}$, $G_{x,y}$ and $B_{x,y}$ are respectively pixel values of the pixel x in red, green and blue channels, $C_{x,y}$ is a gray-scale value of the pixel x after transformation.

5. The method, as recited in claim 3, wherein:

in the step S1, calibrating the road traffic scene comprises selecting a high definition video clip shot by the monitoring camera, wherein a definition thereof is 2592×1936, a video scene covers an intersection of three-driveway-roads; for obtaining physical coordinate parameters related to the images, using a built-in camera calibrating function of OpenCV (an Intel open source computer visual library) for calibrating the road traffic scene; marking image areas according to marked lines of roads with known sizes in the image, so as to inter-transform between an image coordinate system and a physical coordinate system, for obtaining physical coordinates of all positions in the image; furthermore, reading the video with a function of the OpenCV and importing into a computer;

in the step S2, localizing all the vehicle license plates in the video sequence comprises using gray-scale images of black vehicle license plates with white words and white vehicle license plates with black words as color gray-scale images; for blue and yellow vehicle license plates, firstly using a following formula for transforming an image space into a certain color space;

$$C_{x,y} = \|B_{x,y} - \min\{R_{x,y}, G_{x,y}\}\|$$

then using a Sobel operator for calculating an image gradient in a vehicle license plate colorful image; and using a sliding window for scanning a gradient image, so as to obtain an average gradient within the sliding window; wherein a size of the sliding window equals to a size of the vehicle license plate; by using a calibrating result of the OpenCV, the size of the vehicle license plate is obtained;

finally, determining an area size of the vehicle in a scoring image, using a non-maximum suppression method for obtaining a local maximum value within a vehicle area, wherein if the local maximum value is higher than a pre-determined scoring threshold, then the local maximum value is set as a center point; a vehicle license plate area is obtained based on international vehicle license plate size information, and the vehicle license plate area is handled as a candidate vehicle license plate area;

in the step S3, localizing all the vehicle rear lights in the video sequence comprises obtaining the color gray-scale image of each frame in the video sequence according to a color, which is red, of the vehicle rear light; wherein a color gray-scale value of a pixel x in the image is calculated with a following formula:

$$C_{x,y} = R_{x,y} - \max\{G_{x,y}, B_{x,y}\} - \|Gx, y - B_{x,y}\| * 2$$

then using a multi-threshold method for dividing the color gray-scale image into a plurality of binary images;

then respectively processing the binary images with connected part analysis, using connected parts, whose length-width ratios and area values are within a certain range, as vehicle rear light areas;

finally, for overlapping candidate vehicle rear light areas, keeping a largest area for obtaining a detected vehicle rear light area;

wherein in the above formulas, $R_{x,y}$, $G_{x,y}$ and $B_{x,y}$ are respectively pixel values of the pixel x in red, green and blue channels, $C_{x,y}$ is a gray-scale value of the pixel x after transformation.

6. The method, as recited in claim 1, wherein in the step S5, certain detecting areas are set for different violation types; meanwhile, a plurality of evidence images and violation information are stored;

wherein a method for setting the detecting areas of different violations and analyzing the moving trajectories comprises steps of:

(1) for red light running: setting two detecting areas respectively in front of and behind a stop line, recording and analyzing the moving trajectories of each vehicle, wherein if a signal light of a current driveway is a red light, and the moving trajectories passes the two detecting areas in sequence, then the vehicle is regarded as running the red light; extracting three overall images of the vehicle in front of, at and behind the stop line, and a close-up image of the vehicle; calling a vehicle license plate recognizing program for recognizing the vehicle license plate; finally combining the images and marking the violation information comprising a violation time, an intersection location, the driveway and a vehicle license number, for post-treatment by a traffic management department;

(2) for line-pressing driving: marking driveway line areas where line pressing during driving is forbidden; recording and analyzing the moving trajectory of each vehicle, wherein if the moving trajectory passes through the driveway line area, then the vehicle is regarded as being line-pressing driving; extracting an overall image of the vehicle in a line pressing state and a close-up image of the vehicle; calling the vehicle license plate recognizing program for recognizing the vehicle license plate; finally combining the images and marking the violation information, for post-treatment by the traffic management department; and (3) for improper driveway driving: setting two detecting areas respectively at two driveways, wherein if the moving trajectory passes through the two detecting areas in sequence, then the vehicle is regarded as being improper driveway driving; extracting three overall images of the vehicle before, during and after driveway changing, and a close-up image of the vehicle; calling the vehicle license plate recognizing program for recognizing the vehicle license plate; finally combining the images and marking the violation information, for post-treatment by the traffic management department;

thereby, traffic violation detection based on the salient parts is completed.

7. The method, as recited in claim 6, wherein:

in the step S1, calibrating the road traffic scene comprises selecting a high definition video clip shot by the monitoring camera, wherein a definition thereof is 2592×1936, a video scene covers an intersection of three-driveway-roads; for obtaining physical coordinate parameters related to the images, using a built-in camera calibrating function of OpenCV (an Intel open source computer visual library) for calibrating the road traffic scene; marking image areas according to marked lines of roads with known sizes in the image, so as to inter-transform between an image coordinate system and a physical coordinate system, for obtaining physical coordinates of all positions in the image; furthermore, reading the video with a function of the OpenCV and importing into a computer;

in the step S2, localizing all the vehicle license plates in the video sequence comprises using gray-scale images of black vehicle license plates with white words and white vehicle license plates with black words as color gray-scale images; for blue and yellow vehicle license plates, firstly using a following formula for transforming an image space into a certain color space;

$$C_{x,y}=\|B_{x,y}-\min\{R_{x,y}, G_{x,y}\}\|$$

then using a Sobel operator for calculating an image gradient in a vehicle license plate colorful image; and using a sliding window for scanning a gradient image, so as to obtain an average gradient within the sliding window; wherein a size of the sliding window equals to a size of the vehicle license plate; by using a calibrating result of the OpenCV, the size of the vehicle license plate is obtained;

finally, determining an area size of the vehicle in a scoring image, using a non-maximum suppression method for obtaining a local maximum value within a vehicle area, wherein if the local maximum value is higher than a pre-determined scoring threshold, then the local maximum value is set as a center point; a vehicle license plate area is obtained based on international vehicle license plate size information, and the vehicle license plate area is handled as a candidate vehicle license plate area;

in the step S3, localizing all the vehicle rear lights in the video sequence comprises obtaining the color gray-scale image of each frame in the video sequence according to a color, which is red, of the vehicle rear light; wherein a color gray-scale value of a pixel x in the image is calculated with a following formula:

$$C_{x,y}=R_{x,y}-\max\{G_{x,y}, B_{x,y}\}-\|Gx,y-B_{x,y}\|*2$$

then using a multi-threshold method for dividing the color gray-scale image into a plurality of binary images;

then respectively processing the binary images with connected part analysis, using connected parts, whose length-width ratios and area values are within a certain range, as vehicle rear light areas;

finally, for overlapping candidate vehicle rear light areas, keeping a largest area for obtaining a detected vehicle rear light area;

wherein in the above formulas, $R_{x,y}$, $G_{x,y}$ and $B_{x,y}$ are respectively pixel values of the pixel x in red, green and blue channels, $C_{x,y}$ is a gray-scale value of the pixel x after transformation.

8. The method, as recited in claim 1, wherein:

in the step S1, calibrating the road traffic scene comprises selecting a high definition video clip shot by the monitoring camera, wherein a definition thereof is 2592×1936, a video scene covers an intersection of three-driveway-roads; for obtaining physical coordinate parameters related to the images, using a built-in camera calibrating function of OpenCV(an Intel open source computer visual library) for calibrating the road traffic scene; marking image areas according to marked lines of roads with known sizes in the image, so as to inter-transform between an image coordinate system and a physical coordinate system, for obtaining physical coordinates of all positions in the image; furthermore, reading the video with a function of the OpenCV and importing into a computer;

in the step S2, localizing all the vehicle license plates in the video sequence comprises using gray-scale images of black vehicle license plates with white words and white vehicle license plates with black words as color gray-scale images; for blue and yellow vehicle license plates, firstly using a following formula for transforming an image space into a certain color space;

$$C_{x,y} = \|B_{x,y} - \min\{R_{x,y}, G_{x,y}\}\|$$

then using a Sobel operator for calculating an image gradient in a vehicle license plate colorful image; and using a sliding window for scanning a gradient image, so as to obtain an average gradient within the sliding window; wherein a size of the sliding window equals to a size of the vehicle license plate; by using a calibrating result of the OpenCV, the size of the vehicle license plate is obtained;

finally, determining an area size of the vehicle in a scoring image, using a non-maximum suppression method for obtaining a local maximum value within a vehicle area, wherein if the local maximum value is higher than a pre-determined scoring threshold, then the local maximum value is set as a center point; a vehicle license plate area is obtained based on international vehicle license plate size information, and the vehicle license plate area is handled as a candidate vehicle license plate area;

in the step S3, localizing all the vehicle rear lights in the video sequence comprises obtaining the color gray-scale image of each frame in the video sequence according to a color, which is red, of the vehicle rear light; wherein a color gray-scale value of a pixel x in the image is calculated with a following formula:

$$C_{x,y} = R_{x,y} - \max\{G_{x,y}, B_{x,y}\} - \|Gx, y - B_{x,y}\| * 2$$

then using a multi-threshold method for dividing the color gray-scale image into a plurality of binary images;

then respectively processing the binary images with connected part analysis, using connected parts, whose length-width ratios and area values are within a certain range, as vehicle rear light areas;

finally, for overlapping candidate vehicle rear light areas, keeping a largest area for obtaining a detected vehicle rear light area;

wherein in the above formulas, $R_{x,y}$, $G_{x,y}$ and $B_{x,y}$ are respectively pixel values of the pixel x in red, green and blue channels, $C_{x,y}$ is a gray-scale value of the pixel x after transformation.

* * * * *